(12) United States Patent
Guan et al.

(10) Patent No.: US 7,334,048 B1
(45) Date of Patent: Feb. 19, 2008

(54) METHOD AND APPARATUS FOR FAST ROUTE TABLE UPDATE

(75) Inventors: Tao Guan, Sunnyvale, CA (US); Michael Yip, Mountain View, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 709 days.

(21) Appl. No.: 10/164,980

(22) Filed: Jun. 4, 2002

(51) Int. Cl.
*G06F 15/173* (2006.01)

(52) U.S. Cl. .................. 709/242; 709/223; 709/238; 709/230

(58) Field of Classification Search ............... 709/242, 709/223, 238, 249, 230, 240, 243, 244, 200
See application file for complete search history.

(56) References Cited

U.S. PATENT DOCUMENTS

| | | | | |
|---|---|---|---|---|
| 5,517,620 A | * | 5/1996 | Hashimoto et al. | 709/242 |
| 6,052,718 A | * | 4/2000 | Gifford | 709/219 |
| 6,343,326 B2 | * | 1/2002 | Acharya et al. | 709/238 |
| 6,393,486 B1 | * | 5/2002 | Pelavin et al. | 709/238 |
| 6,643,706 B1 | * | 11/2003 | Marques et al. | 709/242 |
| 6,658,481 B1 | * | 12/2003 | Basso et al. | 709/243 |
| 6,765,863 B1 | * | 7/2004 | Wakimoto et al. | 370/218 |
| 6,810,427 B1 | * | 10/2004 | Cain et al. | 709/238 |
| 6,883,034 B1 | * | 4/2005 | Pelavin et al. | 709/242 |
| 6,910,148 B1 | * | 6/2005 | Ho et al. | 714/4 |
| 7,007,100 B1 | * | 2/2006 | Doong et al. | 709/238 |
| 7,039,720 B2 | * | 5/2006 | Alfieri et al. | 709/242 |
| 7,069,343 B2 | * | 6/2006 | Goringe et al. | 709/249 |

OTHER PUBLICATIONS

Internet Engineering Task Force (IETF) Network Working Group, Request for Comments (RFC) 2328, "OSPF Version 2" Apr. 1998. IETF Networking Group, RFC 1930, "Guidelines for Creation, Selection, and Registration of Autonomous System (AS)," Mar. 1996; and IETF Network Working Group, RFC 2453 "RIP Version 2," Nov. 1998.
Douglas E. Conner, "Internet working with TCP/IP Principles, Protocols, and Architectures," Chapter 7, pp. 95-113, (4th ed., Prentice Hall 2000).

* cited by examiner

*Primary Examiner*—Saleh Najjar
*Assistant Examiner*—Faruk Hamza
(74) *Attorney, Agent, or Firm*—Blakely Sokoloff Taylor & Zafman LLC (57) ABSTRACT

A method and apparatus is provided for fast route table updates. A route table entry is identified, and a subsequent route table entry is located using the identified route table entry. All subsequent route table entries are identified using the previous route table entry until all route table entries associated with a predetermined characteristic are identified. The identified entries may be purged or transferred from one route table to another. The predetermined characteristic may be that the route table entries where discovered by a common routing protocol. Route table entries associated with a common routing protocol that is inoperative for a predetermined period are purged.

21 Claims, 9 Drawing Sheets

METHOD AND APPARATUS FOR FAST ROUTE TABLE UPDATE

FIELD OF THE INVENTION

The invention relates to the field of network management. In particular, the invention relates to managing route table entries.

BACKGROUND OF THE INVENTION

A network is a group of two or more network-accessible devices linked by wired or wireless connections. A network-accessible device can be a desktop computer, a personal digital assistant, a mobile or laptop computer, a cellular or mobile telephone, etc. A node is a network-accessible device that is connected to a network.

Networks can be divided into two basic types: circuit-switched and packet-switched. In packet-switched networks, large blocks of data are divided into a number of small packets. A packet is a small block of data sent across a network. Typically, each packet contains a source and destination address as well as the small block of data.

Routers are specialized computers that interconnect two networks and pass packets from one to another. Generally, a router examines the destination address of each packet that passes through the router. Based on the destination address, the router decides which path a packet will travel during the next hop in the packet's journey. Routers use route tables to store information about how to reach destinations.

Typically, route tables contain two pieces of information about each destination that a router serves: the address of the destination network and the address of the next router along the path to each destination. The next router along the path to a destination is called the next hop. Routers read a packet's destination address and send the packet to the next hop towards the packet's final destination.

Routing protocols discover paths to destinations and provide that information to the processes that manage route tables. Rediscovery means that a routing protocol discovers a route again after the routing protocol has been inoperative for a period of time. Examples of routing protocols are: open shortest path first (OSPF), routing information protocol (RIP), and border gateway protocol (BGP). Routing protocols are well known in the art and will not be further described except as they relate to the invention that is the subject of this application. For a further discussion of routing protocols see, e.g., Internet Engineering Task Force (IETF) Network Working Group, Request for Comments (RFC) 2328, "OSPF Version 2" April 1998; IETF Networking Group, RFC 1930, "Guidelines for Creation, Selection, and Registration of an Autonomous System (AS)," March 1996; and IETF Network Working Group, RFC 2453 "RIP Version 2," November 1998.

Peering is a relationship between two or more networks in which the networks agree to forward packets directly to each other. Each routing protocol of a given type (e.g., OSPF, RIP, BGP, etc.) residing on a router in one network forwards packets to a routing protocol of the same type in another network. Routing protocols of the same type (e.g., OSPF, RIP, BGP, etc.) that directly forward packets to each other are called peer routing protocols or simply peers.

Conventional routers employ multiple routing protocols that are compiled as a single executable file. Each routing protocol maintains a separate routing database in a data structure specific to the routing protocol and the router maintains a central route table containing the routes discovered by each routing protocol. For the purposes of this application, the routing database maintained by a routing protocol is a type of route table. Periodically, routing protocols become inoperable for reasons such as the routing protocol is being updated or the routing protocol has suffered a technical malfunction. If all of the routing protocols operating on a router are integrated into a single executable process, the entire router is inoperative if a single routing protocol is inoperative.

A solution to the deficiencies of the conventional router is to separate the routing protocols so that each routing protocol executes as an independent process. If each routing protocol executes independently, then any particular routing protocol can be inoperative without making the entire router inoperative. If the routing protocols are separated, however, they do not automatically share information with each other about the routes they discover. Therefore, it is desirable for the router to maintain a central route table that each routing protocol can interact with independently.

A central route table that operates independently of the routing protocols must include a mechanism for quick and efficient route table updates, particularly when all routes for a given protocol must be purged and quickly relearned. For example, if one of the routing protocols becomes inoperative, then it will not update the entries it has made in the central route table. One or more entries associated with the inoperative protocol may become invalid subsequent to the time the protocol becomes inoperative. Once a routing protocol is determined to be inoperative, a mechanism is needed to quickly purge all of the entries associated with the inoperative routing protocol. Also, a mechanism is needed to transfer a set of entries from a route table that is part of one executing process to a route table that is part of another executing process so that route tables can be quickly populated.

SUMMARY

According to one aspect of the invention, a method is provided to identify a route table entry and then identify a subsequent route table entry using the previous route table entry. Similarly, all subsequent route table entries are identified using the previous route table entry until all route table entries associated with a predetermined characteristic (e.g., having a common routing protocol) have been identified.

According to one aspect of the invention, the identified route table entries are purged from the route table. The process managing the route table (hereinafter "route manager") may purge the route table entries associated with a given routing protocol, when the routing protocol is inoperative for a predetermined period of time.

According to another aspect of the invention, the identified route table entries are transferred from one route table to another route table. The route manager may transfer a set of entries associated with a predetermined characteristic (e.g., a common routing protocol) or the route manager may request that a set of entries associated with a predetermined characteristic be transferred to the central route table.

In accordance with these and other aspects of the invention an apparatus is provided for carrying out the above and other methods.

BRIEF DESCRIPTION OF DRAWINGS

The invention will be described by way of exemplary embodiments, but not limitations, illustrated in the accompanying drawings in which like references denote similar elements, and in which.

DETAILED DESCRIPTION OF THE INVENTION

In the following description various aspects of the invention, a method and apparatus for fast route table updates, are described. Specific details will be set forth in order to provide a thorough understanding of the invention. However, it will be apparent to those skilled in the art that the invention may be practiced with only some or all of the described aspects of the invention, and with or without some or all of the specific details. In some instances, well known architectures, steps, and techniques have not been shown to avoid unnecessarily obscuring the invention. For example, specific details are not provided as to whether the method and apparatus is implemented as a software routine, hardware circuit, firmware, or a combination thereof.

Parts of the description will be presented using terminology commonly employed by those skilled in the art to convey the substance of their work to others skilled in the art, including terms of operations performed by a network operating system, and their operands, such as transmitting, receiving, routing, login, packets, messages, user name, command, and the like. As well understood by those skilled in the art, these operands take the form of electrical, magnetic, or optical signals, and the operations involve storing, transferring, combining, and otherwise manipulating the signals through electrical, magnetic or optical components of a system. The term system includes general purpose as well as special purpose arrangements of these components that are standalone, adjunct, or embedded.

Various operations will be described as multiple discrete steps performed in turn in a manner that is most helpful in understanding the invention. However, the order of description should not be construed as to imply that these operations are necessarily performed in the order they are presented, or even order dependent. Lastly, repeated usage of the phrase "in one embodiment" or "one aspect" does not necessarily refer to the same embodiment or the same aspect, although it may.

Figure 1:
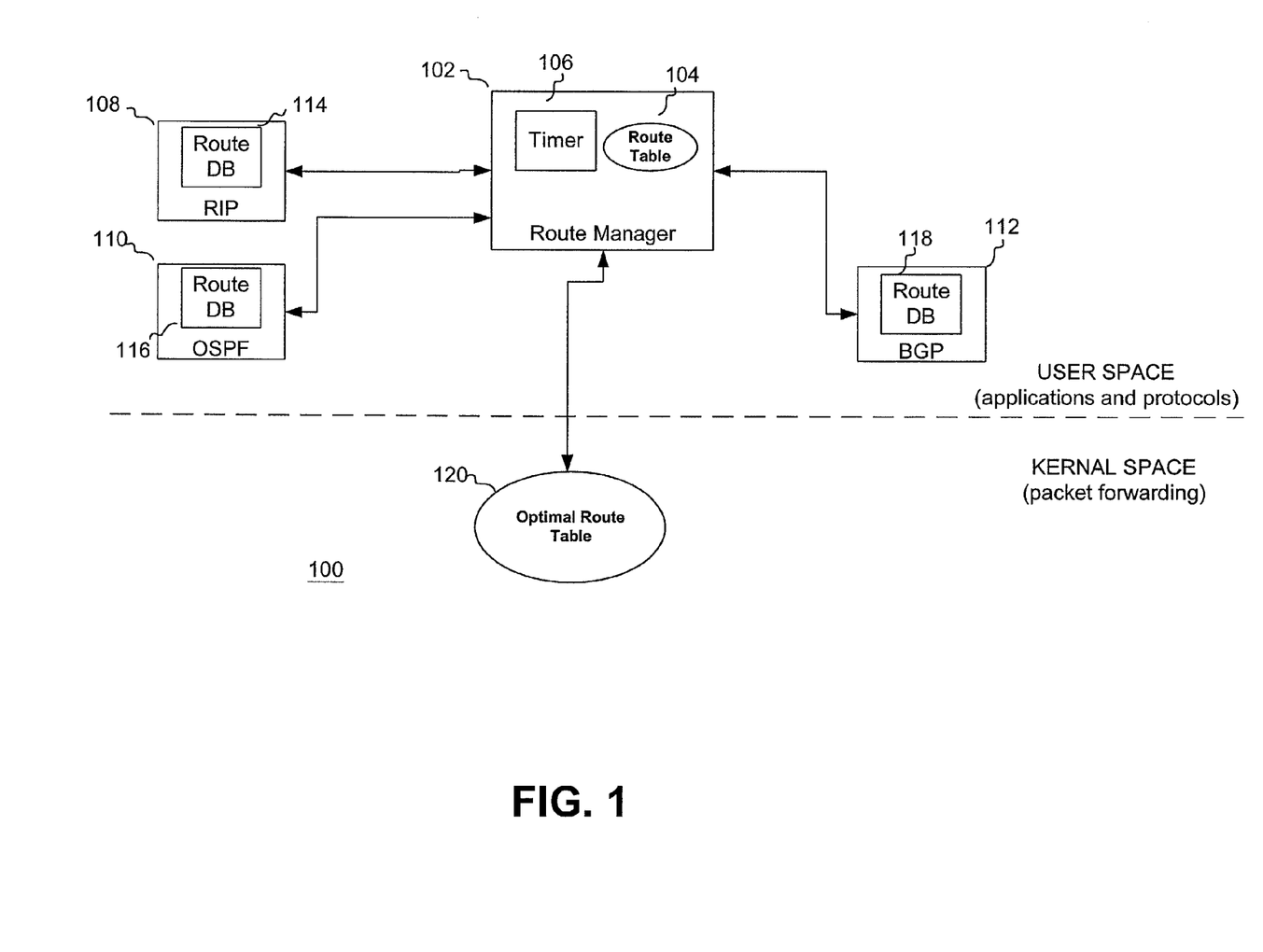
FIG. 1 is a block diagram illustrating a router incorporating a route manager in accordance with one embodiment of the invention and the operating environment in which certain aspects of the invention may be practiced.

FIG. 1 is a block diagram illustrating a router incorporating a route manager in accordance with one embodiment of the invention and the operating environment in which certain aspects of the invention may be practiced. Router 100 includes route manager 102, routing protocols 108-112, and optimal route table 120. Route manager 102 includes central route table 104 and timer 106.

Routing protocols 108-112 provide routes to route manager 102. While FIG. 1 shows three routing protocols, there is no requirement or restriction regarding the number of routing protocols that provide routes to route manager 102. In one embodiment of the invention, central route table 104 is maintained in the user space of the router. Central route table 104, however, is not required to be maintained in the user space of the router. Route manager 102 receives routes from routing protocols 108-112 and places the routes in central route table 104.

Route manager 102 also serves as an intermediary between routing protocols 108-112. Each routing protocol maintains an individual database of routes that the routing protocol has discovered. In one embodiment of the invention, route manager 102 provides the routes that each routing protocol discovers to the other routing protocols that are connected to the route manager. Thus, route database 114, for example, contains routes that routing protocol 108 has discovered and also routes that routing protocols 110-112 have discovered.

Route manager 102 provides routes to optimal route table 120. In one embodiment of the invention, route manager 102 only provides the preferred routes to each destination to optimal route table 120. A preferred route is a route that router 100, based on certain criteria, selects to use when more than one route to a destination is available. The criteria by which a preferred route is selected varies for each routing protocol, according to one embodiment of the invention. For example, if routing protocol 108 discovers more than one route to a given location, it selects the route requiring the fewest hops as the preferred route. In one embodiment of the invention, optimal route table 120 is in the kernal space. Optimal route table 120, however, is not required to be in the kernal space in order to practice the invention described herein.

A method and apparatus to rapidly identify and manipulate route table entries that share a predetermined characteristic is described herein. In one embodiment of the invention, it is the route table entries in central route table 104 that are identified and manipulated. In an embodiment of the invention it is the route table entries in optimal route table 120 that are identified and manipulated. The invention, however, is not restricted to route table entries on route table 104 and optimal route table 120. For example, in one embodiment of the invention, route manager 102 provides routes to subsidiary route managers maintaining subsidiary route tables. In such an embodiment of the invention, the route table entries in the subsidiary route tables may be rapidly identified and manipulated.

Figure 2A:
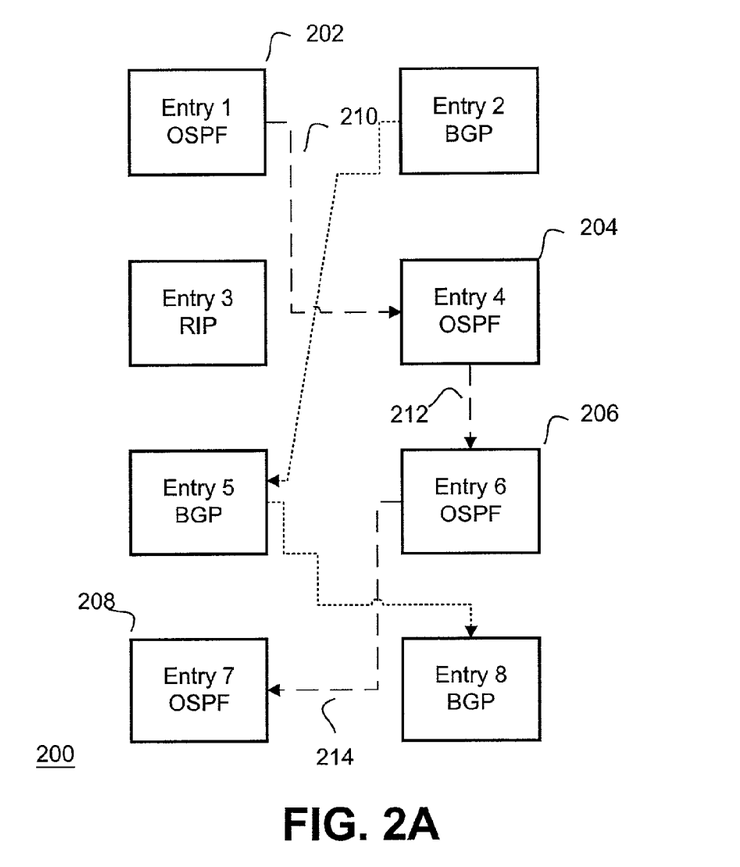
FIGS. 2A and 2B are block diagrams illustrating a number of route table entries structured in accordance with certain aspects of the invention.

FIG. 2A is a block diagram illustrating a number of route table entries structured in accordance with certain aspects of the invention. In one embodiment of the invention, each route received by route manager 102 is associated with at least one other route that is provided to the route manager by the same routing protocol. The association between route table entries provides a way to locate a subsequent route table entry from a previous route table entry. For example, entry 202 is associated with entry 204. Entry 204 is associated with entry 206, which is associated with entry 208. In an embodiment of the invention, entries 202-208 were discovered by a common routing protocol (e.g., OSPF).

All entries in route table 200 that are associated with a particular routing protocol can be rapidly identified. For example, entry 202 identifies the location of entry 204 through association 210. Similarly, entry 204 identifies the location of entry 206 with association 212 and entry 206 identifies the location of entry 208 with association 214. Each entry in route table 200 can be located by using a preceding entry. Therefore, all entries associated with a particular routing protocol can be identified very rapidly because each identified entry provides the location of a subsequent entry to be identified.

Figure 2B:
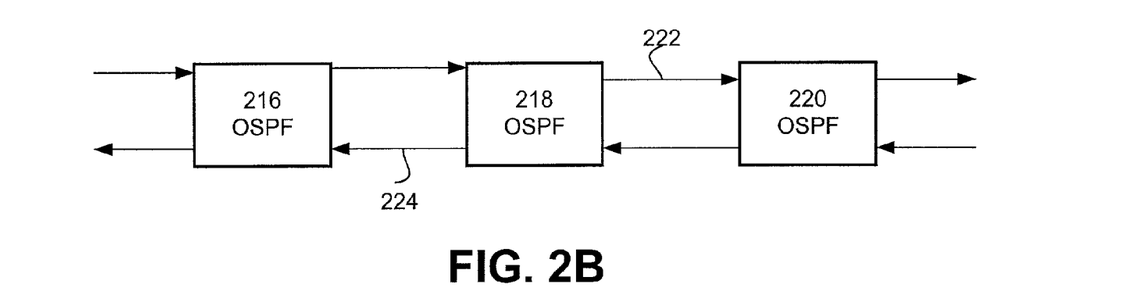

FIG. 2B is a block diagram illustrating an alternative embodiment of the structure of route table entries in route table 200. FIG. 2B shows route table entries 216, 218, and 220. Route table entries 216-220 were provided by the same routing protocol (e.g., OSPF). Each entry in FIG. 2B is associated with both a subsequent entry and a preceding entry. Therefore, each entry in FIG. 2B can locate both the subsequent and preceding entries in the route table. For example, entry 218 can locate entry 220 through association 222 and also entry 216 through association 224. The process of identifying all of the entries associated with a given routing protocol in FIG. 2B can be accomplished particularly quickly because each identified entry provides the location of two entries and, therefore, identification can occur in two directions simultaneously.

Figure 3:
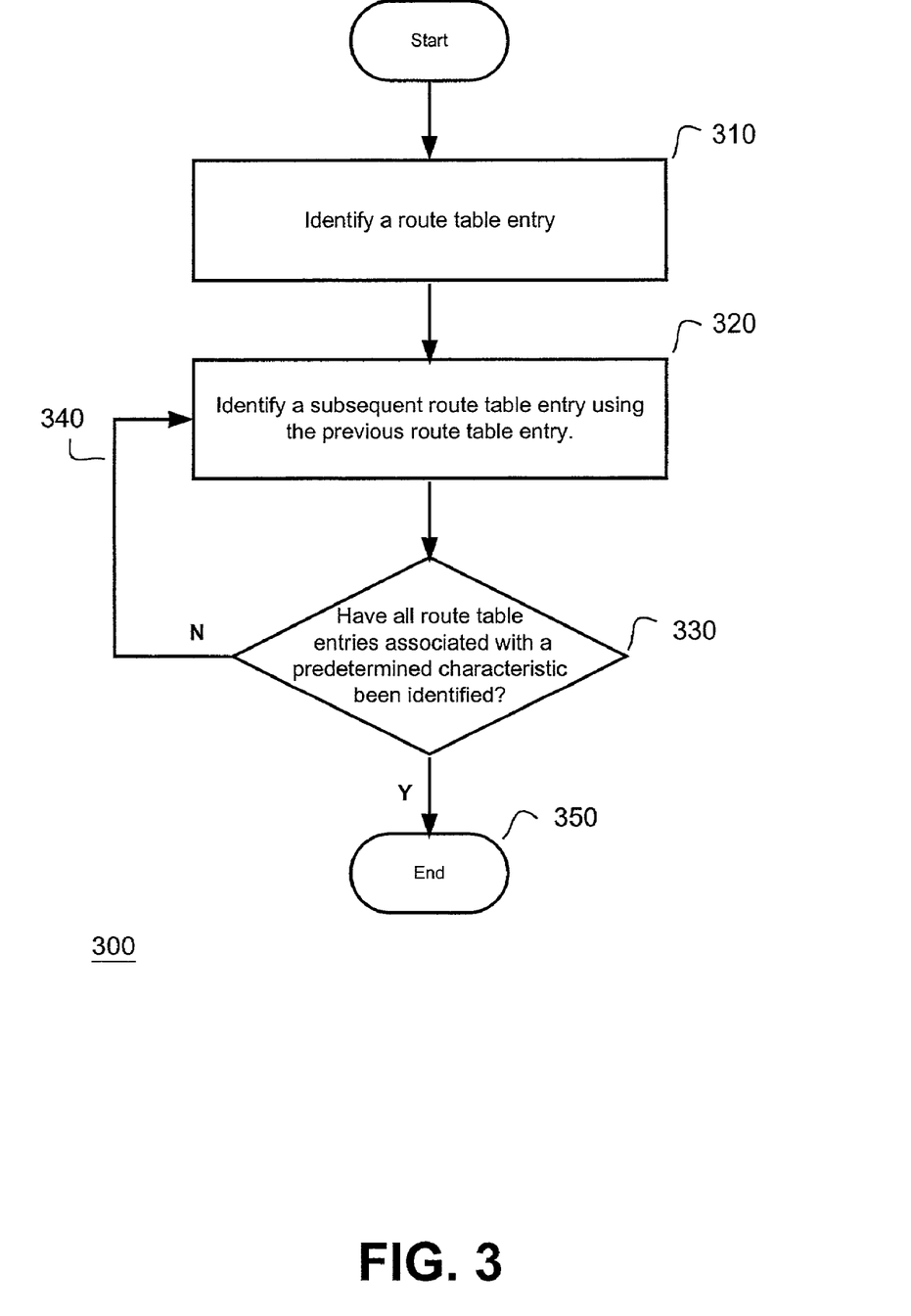
FIG. 3 is a flow diagram illustrating certain aspects of a method to be performed by a router executing one embodiment of the illustrated invention.

Turning now to FIG. 3, the particular methods of an embodiment of the invention are described in terms of computer software with reference to a series of flowcharts. The methods to be performed by a computer constitute computer programs made up of computer-executable instructions. Describing the methods by reference to a flowchart enables one skilled in the art to develop such programs including such instructions to carry out the methods on suitably configured computers (the processor of the computer executing the instructions from computer-accessible media). The computer-executable instructions may be written in a computer programming language or may be embodied in firmware logic. If written in a programming language conforming to a recognized standard, such instructions can be executed on a variety of hardware platforms and for interface to a variety of operating systems. In addition, the embodiments of the invention are not described with reference to any particular programming language. It will be appreciated that a variety of programming languages may be used to implement the teachings of the embodiments of the invention as described herein. Furthermore, it is common in the art to speak of software, in one form or another (e.g., program, procedure, process, application, etc.), as taking an action or causing a result. Such expressions are merely a shorthand way of saying that execution of the software by a computer causes the processor of the computer to perform an action or produce a result.

FIG. 3 is a flow diagram illustrating certain aspects of a method to be performed by a router executing one embodiment of the illustrated invention. At process block 310, route manager 102 identifies a route table entry. In one embodiment of the invention, route manager 102 identifies any one of the entries provided to it by a particular routing protocol. In an embodiment of the invention, the identified entry is associated with a subsequent route table entry that was provided by the same routing protocol as the identified entry.

In alternate embodiments of the invention, the association between the route table entries is based on another shared characteristic. For example, in one embodiment of the invention, route table entries that are provided by a particular peer routing protocol are associated with one another.

At process block 320, route manager 102 locates the subsequent entry based on the association between the identified entry and the subsequent entry. Route manager 102 is able to locate the subsequent entry very quickly because it does not have to perform a search to locate the entry. In an alternate embodiment of the invention, the identified entry is associated with two other entries sharing a common routing protocol. In such an embodiment of the invention, route manager 102 locates one (or both) of the subsequent entries based on the associations with the identified entry.

At process block 330, route manager 102 determines whether all entries associated with a predetermined characteristic (e.g., a common routing protocol) have been identified. In one embodiment of the invention, route manager 102 makes the determination based on whether a given entry is associated with another entry that has not yet been identified. If route manager 102 determines that not all entries associated with predetermined characteristic have been identified, it identifies a subsequent entry at 340. Alternatively, if route manager 102 determines that all entries associated with a predetermined characteristic have been identified, it exits the flow diagram at 350.

Figure 4A:
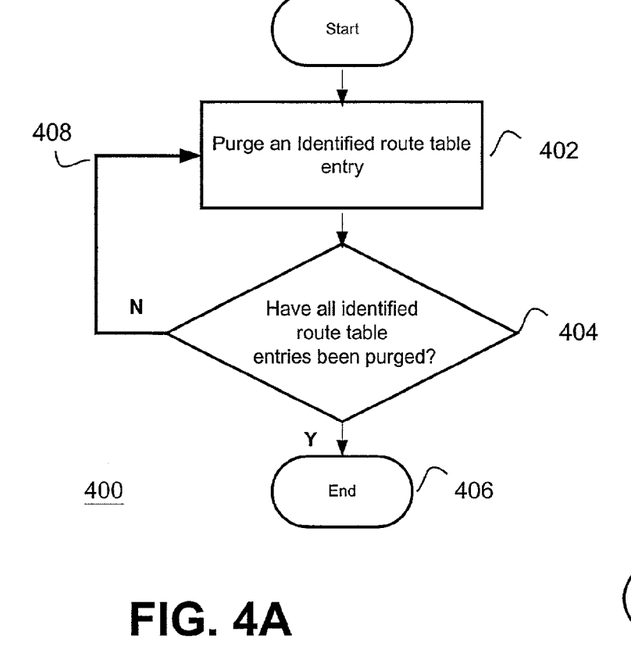
FIGS. 4A and 4B are flow diagrams illustrating certain aspects of a method to be performed by a router executing one embodiment of the illustrated invention after the entries associated with a predetermined characteristic have been identified.
Figure 4B:
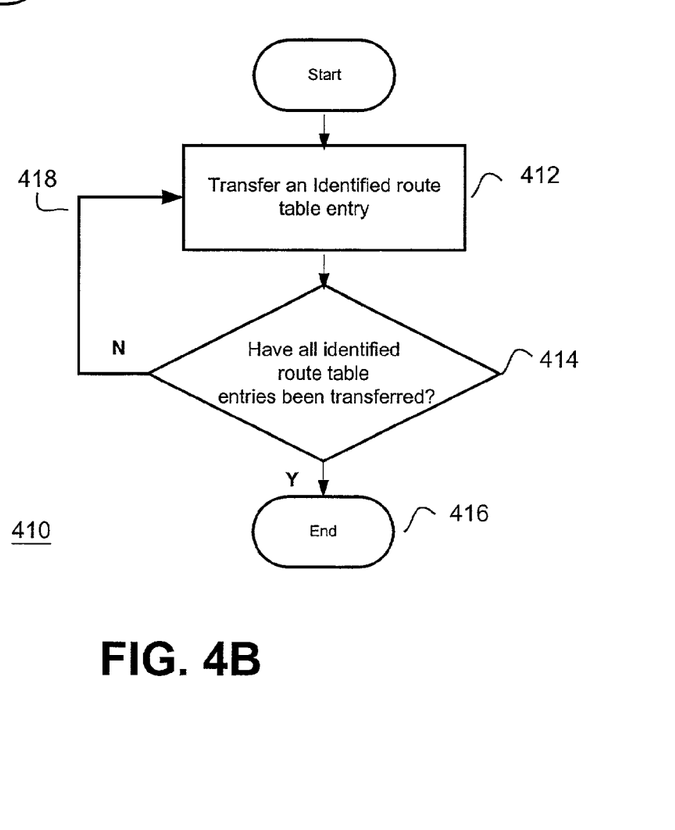

FIGS. 4A and 4B are flow diagrams illustrating certain aspects of a method to be performed by a router executing one embodiment of the illustrated invention after the entries associated with a predetermined characteristic have been identified. Process 400 is used to purge the entries that were identified according to process 300. In one embodiment of the invention, route manager 102 uses timer 106 to determine whether a routing protocol is inoperative for a predetermined period of time. The routes provided by an inoperative routing protocol are purged after the predetermined time, according to an embodiment of the invention. If the inoperative routing protocol becomes operative again, routes provided by the routing protocol may still be purged if they are not rediscovered within a predetermined period of time, according to an embodiment of the invention.

At process block 402, route manager 102 purges an identified entry. The identified entry is identified according to process 300. Route manager 102 determines whether all identified entries have been purged at process block 404. If all identified entries have not been purged, route manager 102 selects the next identified entry at 408 and purges it at 402. When all identified entries have been purged, route manager 102 exits process 400 at 406.

Because there are separately executing processes maintaining separate route tables, it is desirable to be able to rapidly transfer in bulk, a selected set of entries from one route table to another. For example, if route manager 102 is rendered inoperative, it may lose the routes contained in central route table 104. Once route manager 102 becomes operative again, it is desirable to rapidly repopulate central route table 104 by transferring in bulk the entries contained in routing protocol databases 114-118. The term "bulk route transfer" refers to this process of rapidly repopulating a route table by transferring an associated set of entries. Process 410 facilitates bulk route transfers, according to an embodiment of the invention.

At process block 412, route manager 102 transfers an identified entry. The identified entry is identified according to process 300. Route manager 102 determines whether all identified entries have been transferred at process block 414. If all identified entries have not been transferred, route manager 102 selects the next identified entry at 418 and transfers it at 412. When all identified entries have been transferred, route manager 102 exits process 410 at 416.

According to an embodiment of invention, the association between route table entries is implemented by using pointers to create linked lists of entries sharing a predetermined characteristic. A pointer stores a reference to another value. A linked list is a collection of objects stored in a list form. Each object in a linked list contains a pointer that references another object in the list. A doubly linked list is a linked list in which each object stores two pointers that point to two other objects in the list. Pointers and linked lists are well known in the art and will not be further described except as they pertain to embodiments of the invention.

Figure 5:
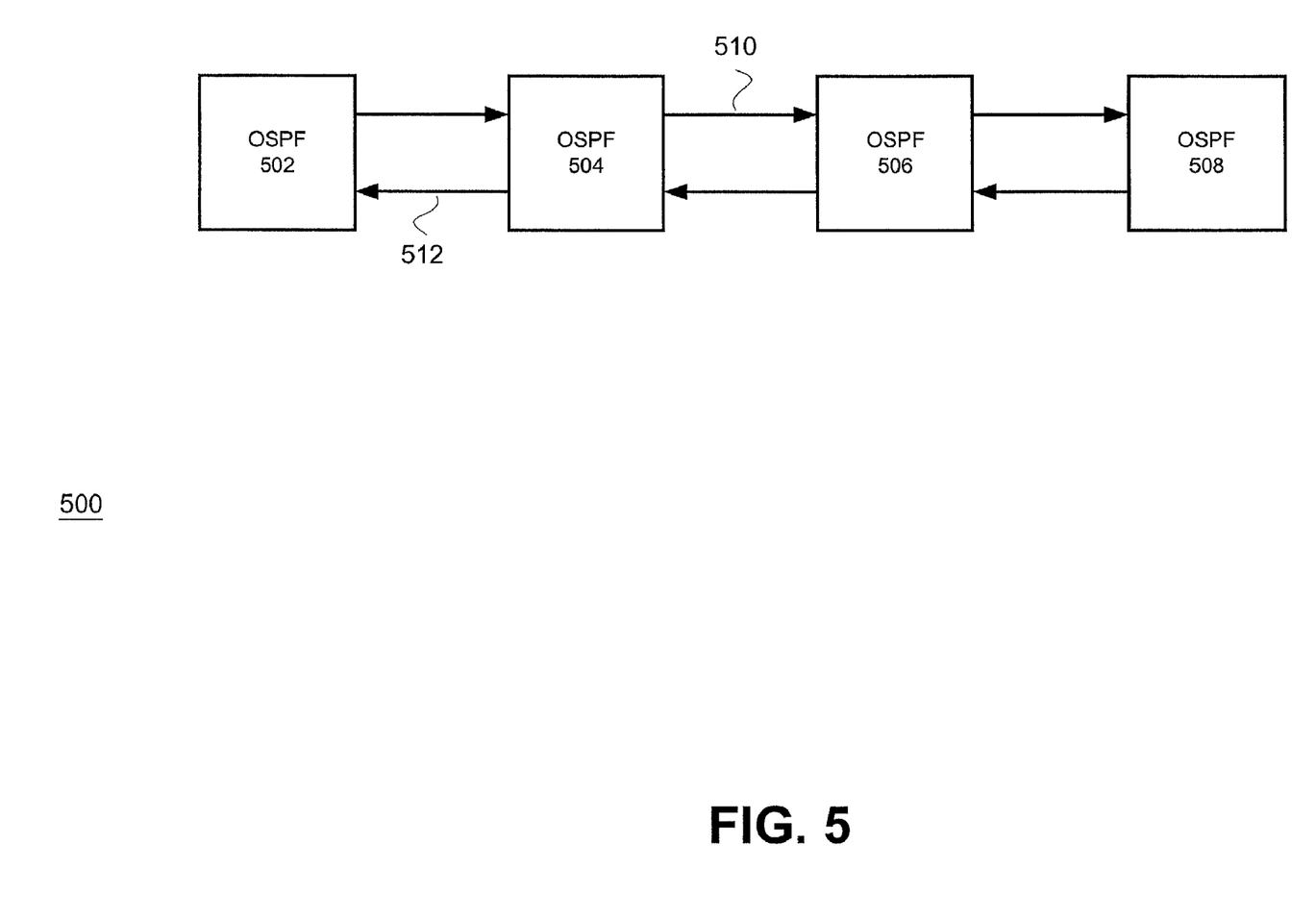
FIG. 5 is a block diagram illustrating a linked list of route table entries according to an embodiment of the invention.

FIG. 5 is a block diagram illustrating a linked list of route table entries according to an embodiment of the invention. FIG. 5 shows route table entries 502-508. Each route table entry includes information about a particular route. Typically, route table entries 502-508 include information such as a gateway address, output interface, cost, priority, and protocol, although the invention is not limited to entries including these attributes. In an embodiment of the invention, route table entries 502-508 also include two new attributes: protocol_next and protocol_previous. While the names protocol_next and protocol_previous are used to help describe the invention, a person of ordinary skill in the art will see that the invention is not limited to pointers using these names.

These new route table entry attributes are pointers that link entries sharing a common characteristic into a linked list. In one embodiment of the invention, the associating characteristic is that the entries were discovered by a common routing protocol. The invention, however, is not limited to associating entries based on being discovered by a common routing protocol. In alternative embodiments of the invention, for example, the associating characteristic is that the entries originated with a particular peer routing protocol.

Protocol_next is illustrated at 510 and protocol_previous is illustrated at 512. In one embodiment of the invention, the entries made by a particular routing protocol are linked together. In that embodiment of the invention, route manager 102 can very rapidly purge the entries associated with a particular protocol. Purging all entries made by a particular routing protocol is desirable if, for example, the protocol is inoperative for a predetermined period of time. Similarly, either route manager 102 or routing protocols 108-112 can request a bulk route transfer from each other if one or more route tables needs to repopulated after a process has been returned to operation. In an embodiment of the invention containing subsidiary route managers, route manager 102 and the subsidiary route managers can employ bulk route transfers to repopulate their respective route tables.

Figure 6:
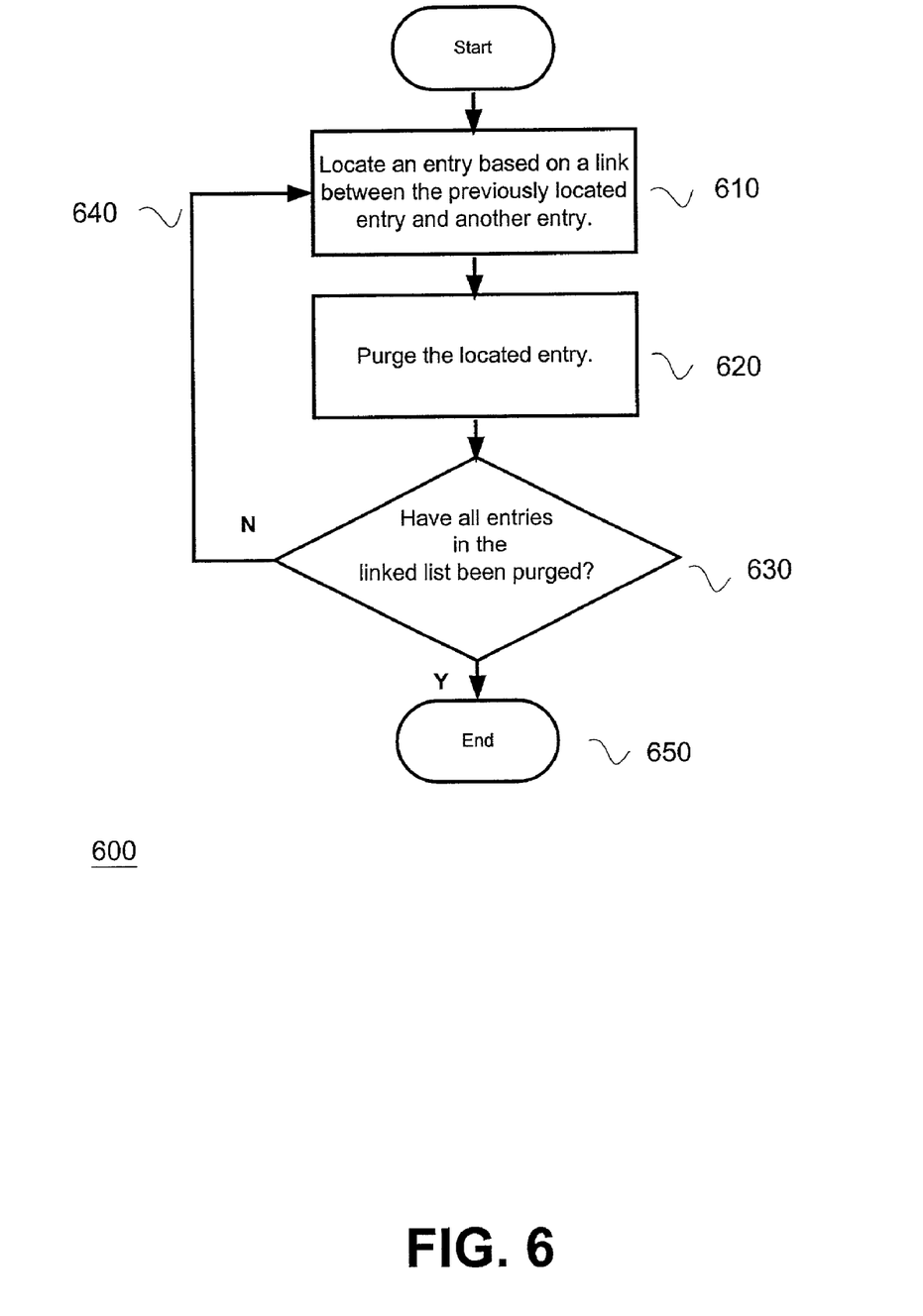
FIG. 6 is a flow diagram illustrating certain aspects of a method to be performed by a computer executing one embodiment of the illustrated invention shown in FIG. 5.

FIG. 6 is a flow diagram illustrating certain aspects of a method of purging a linked list of route table entries to be performed by a computer executing one embodiment of the illustrated invention shown in FIG. 5. At process block 610, route manager 102 locates a route table entry based on a pointer linking the located entry to another entry. The located entry is purged at process block 620. Route manager 102 determines whether all entries in the linked list have been purged at process block 630. If not all of the entries in the linked list have been purged, route manager 102 locates another entry using a pointer at 640. When all entries in the linked list have been purged, route manager 102 exits process 600 at 650.

Figure 7:
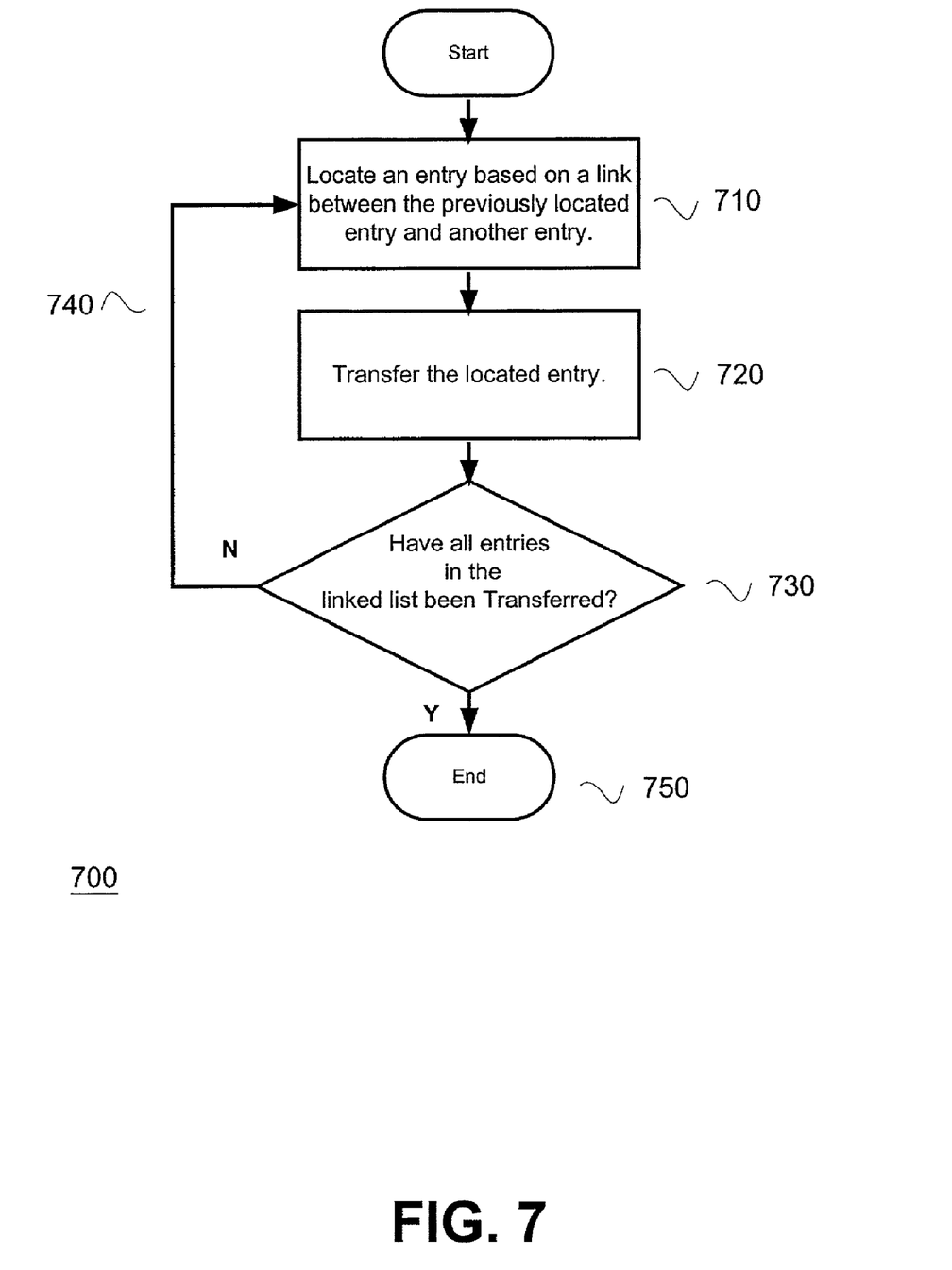
FIG. 7 is a flow diagram illustrating certain aspects of a method to be performed by a computer executing one embodiment of the illustrated invention shown in FIG. 5.

FIG. 7 is a flow diagram illustrating certain aspects of a method of bulk route transfer of a linked list of route table entries to be performed by a computer executing one embodiment of the illustrated invention shown in FIG. 5. At process block 710, route manager 102 locates an entry based on a pointer linking the located entry to another entry. The located entry is transferred at process block 720. In one embodiment of the invention, the bulk route transfer of a linked list of route table entries can be from route manager 102 to one of the routing protocols or from one of the routing protocols to route manager 102. In an embodiment of the invention that includes subsidiary route managers, the bulk route transfer can be between route manager 102 and any of the subsidiary route managers.

Route manager 102 determines whether all entries in the linked list have been transferred at process block 730. If not all of the entries in the linked list have been transferred, route manager 102 locates another entry using a pointer at 740. When all entries in the linked list have been transferred, route manager 102 exits process 700 at 750.

Figure 8:
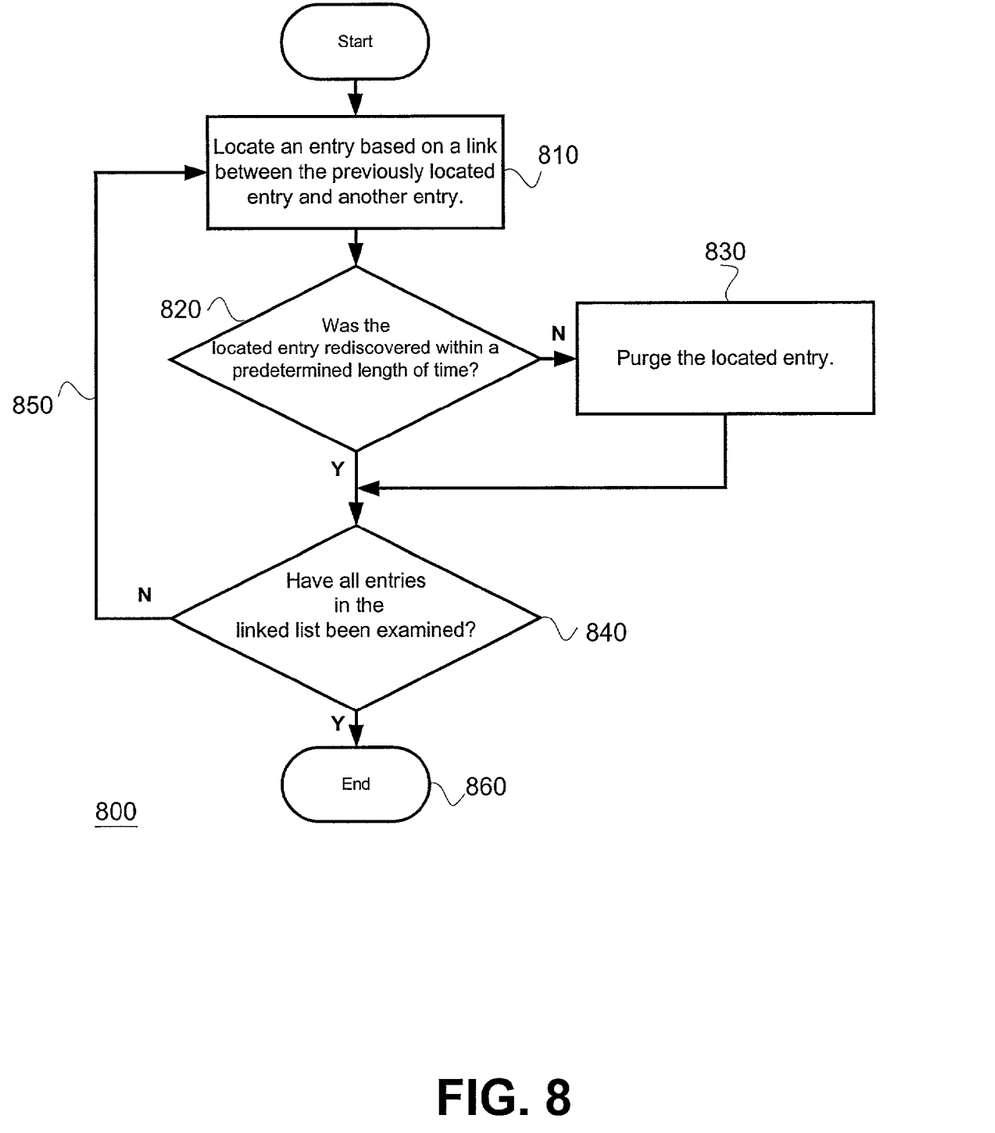
FIG. 8 is a flow diagram illustrating certain aspects of a method of purging entries from a linked list of route table entries to be performed by a computer executing one embodiment of the illustrated invention shown in FIG. 5.

FIG. 8 is a flow diagram illustrating certain aspects of a method of purging entries from a linked list of route table entries to be performed by a computer executing one embodiment of the illustrated invention shown in FIG. 5. Process 800 is applicable, for example, if a routing protocol has returned to being operable after having been inoperable for a period of time. In an embodiment of the invention, route manager 102 employs process 800 to determine whether routes in a route table have been rediscovered by the now operable routing protocol. Route manager 102 uses timer 106 to determine whether a routing protocol has been inoperable for a predetermined length of time and whether a route has been rediscovered within a predetermined length of time, in an embodiment of the invention.

At process block 810, route manager 102 locates a route table entry based on a pointer linking the located entry to another entry. Route manager 102 determines whether the located entry has been rediscovered within a predetermined period of time, at process block 820. If the located entry has not been rediscovered within a predetermined period of time, route manager 102 purges the entry at process block 830. Route manager 102 determines whether all entries in the relevant linked list have been examined at process block 840. If not all of the entries have been examined, route manager 102 locates another entry using a pointer at 850. When all entries in the linked list have been examined, route manager 102 exits process 800 at 860.

Figure 9:
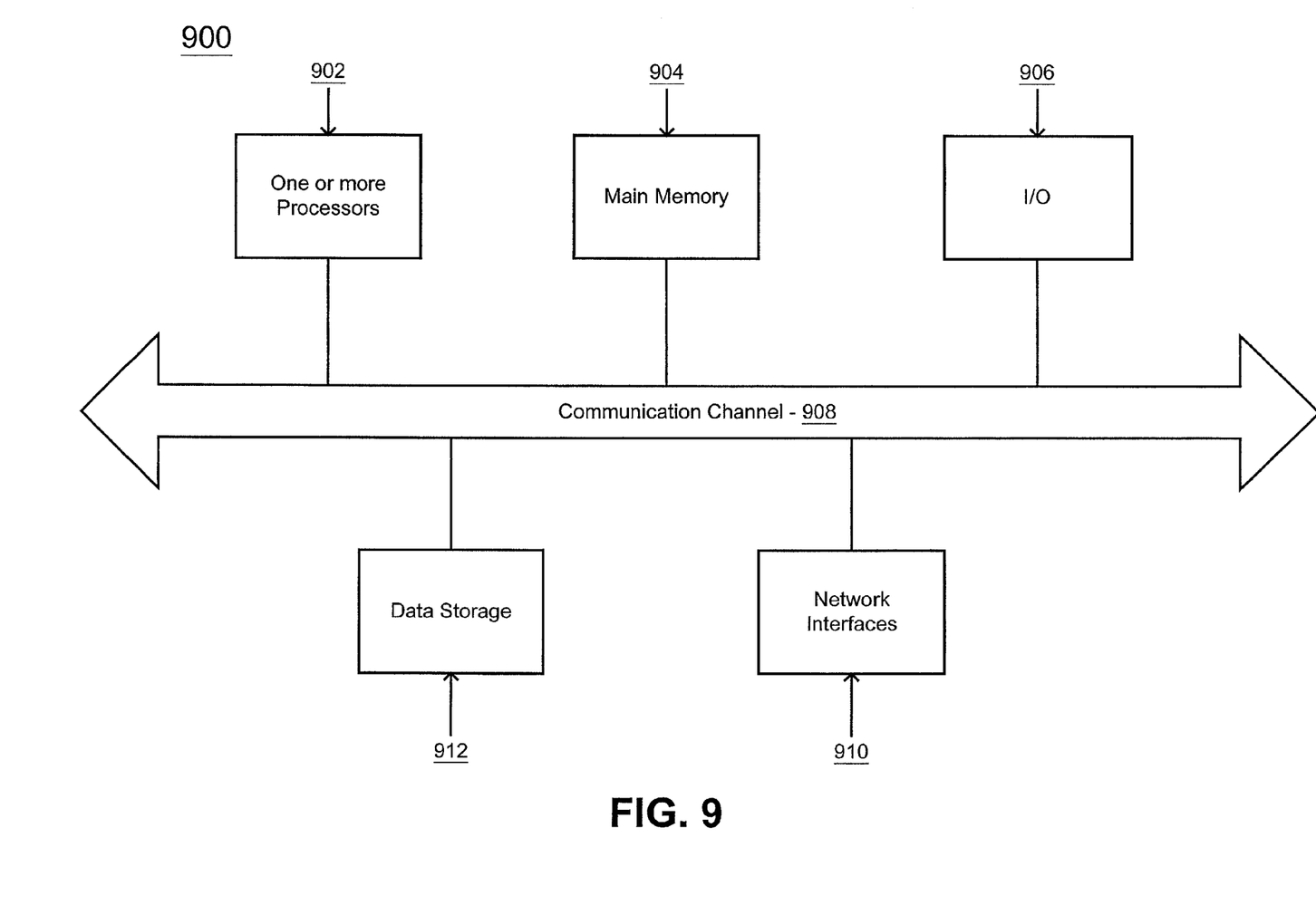
FIG. 9 is a block diagram illustrating a suitable computing environment in which certain aspects of the illustrated invention may be practiced.

FIG. 9 is a block diagram illustrating a suitable computing environment in which certain aspects of the illustrated invention may be practiced. In one embodiment of the invention, the method for fast route table update may be implemented on computer system 900. Computer system 900 includes one or more processors 902, main memory 904, input/output (I/O) devices 906, communication channel 908, network interfaces 910, and data storage 912. The components perform their conventional functions, which are known in the art, and provide the means for implementing the method for fast route table update. Collectively, these components represent a broad category of hardware systems, including but not limited to general-purpose computer systems and specialized packet-forwarding devices.

It is to be appreciated that various components of computer system 900 may be rearranged, and that certain implementations of the invention may not require nor include all of the above components. Furthermore, additional components may be included in computer system 900, such as additional processors (e.g., digital signal processors), storage devices, memories, network/communication interfaces, etc.

In the illustrated embodiment of FIG. 9, the method and apparatus for fast route table update in accordance with one embodiment of the invention as discussed above may be implemented as a series of software routines executed by computer system 900. The software routines may comprise a plurality or series of instructions, code sequences, configuration information, or other data to be accessed and/or executed by a processing system such as one or more processors 902. Initially, the series of instructions, code sequences, configuration information, or other data may be stored on data storage component 912 and transferred to main memory 904 via communication channel 908. It is to be appreciated that the series of instructions, code sequences, configuration information, or other data can be stored in data storage component 912 using any conventional computer-readable or machine accessible storage medium, such as a diskette, CD-ROM, magnetic tape, DVD, ROM, etc. It is also to be appreciated that the series of instructions, code sequences, configuration information, or other data need not be stored locally, and could be stored on a propagated data signal received from a remote storage device, such as a server on a network, via network interface 910. The instructions, code sequences, configuration information, or other data may be copied form data storage component 912, such as mass storage, or from the propagated data signal into main memory 904 and accessed and executed by processor 902.

Alternate embodiments of the invention are implemented in discrete hardware or firmware. For example, one or more application specific integrated circuits (ASICs) could be programmed with some or all of the above-described functions of the invention.

Accordingly, a novel method of apparatus is described for fast route table updates. From the foregoing description, those skilled in the art will recognize that many other variations of the invention or possible. In particular, while the invention has been described as being implemented in a network comprising one or more routers 100, some of the logic may be distributed in other components of a network or internetwork application. Thus, the invention is not limited by the details described. Instead, the invention can be practiced with modifications and alterations within the spirit and scope of the appended claims.

What is claimed is:

1. A method comprising:
   identifying a first route table entry having a predetermined characteristic, the identified route table entry having a link to a next route table entry having the predetermined characteristic;
   identifying the next route table entry using the link with the first route table entry;
   identifying additional route table entries having the predetermined characteristic by using one or more links with identified route table entries until all route table entries having the predetermined characteristic have been identified, the identified route table entries forming a set; and
   transferring the set of route table entries from a first route table associated with a first executing process to a second route table associated with a second executing process.

2. The method of claim 1, further comprising purging the identified route table entries.

3. The method of claim 1, wherein the common predetermined characteristic is a common routing protocol.

4. The method of claim 3, further comprising:
   detecting that the common routing protocol is inoperative;
   detecting that the common routing protocol becomes operational again within a predetermined period of time;
   determining whether the identified route table entries have been rediscovered within a predetermined period of time; and
   purging those identified route table entries that are not rediscovered within a predetermined period of time.

5. The method of claim 3, further comprising:
   detecting that a routing protocol is inoperative for a predetermined period; and
   purging the identified route table entries that are associated with the inoperative routing protocol.

6. The method of claim 1, wherein identifying the subsequent route table entry using the previous route table entry comprises using a pointer in the previous route table entry to locate the subsequent route table entry.

7. The method of claim 1, wherein the common predetermined characteristic is that the identified route table entries originated from a common peer routing protocol.

8. An article of manufacture comprising:
   an electronically accessible medium providing instructions, that when executed by one or more processors, cause the one or more processors to
   identify a first route table entry having a predetermined characteristic, the identified route table entry having a link to a next route table entry having the predetermined characteristic;
   identify the next route table entry using the link with the first route table entry; and
   identify additional route table entries having the predetermined characteristic by using one or more links with identified route table entries until all route table entries having the predetermined characteristic have been identified, the identified route table entries forming a set; and
   transferring the set of route table entries from a first route table associated with a first executing process to a second route table associated with a second executing process.

9. The article of manufacture of claim 8, wherein the instructions further cause the one or more processors to purge the identified route table entries.

10. The article of manufacture of claim 8, wherein the instructions further cause the one or more processors to transfer the identified route table entries form a first route table to a second route table.

11. The article of manufacture of claim 8, wherein the instructions further cause the one or more processors to identify a subsequent route table entry using the previous route table entry wherein the entries are associated with a common routing protocol.

12. The article of manufacture of claim 11, wherein the instructions further cause the one or more processors to
   detect that the common routing protocol is inoperative;
   detect that the common routing protocol becomes operational again within a predetermined period of time;
   determine whether the identified route table entries have been rediscovered within a predetermined period of time; and
   purge those identified route table entries that are not rediscovered within a predetermined period of time.

13. The article of manufacture of claim 11, wherein the instructions further cause the one or more processors to
   detect that a routing protocol is inoperative for a predetermined period; and
   purge the identified route table entries that are associated with the inoperative routing protocol.

14. The article of manufacture of claim 11, wherein the instructions further cause the one or more processors to
   detect a request to transfer the identified route table entries; and
   transfer the identified route table entries.

15. The article of manufacture of claim 8, wherein the instructions further cause the one or more processors to identify a subsequent route table entry using the previous route table entry further comprises using a pointer in the previous route table entry to locate the subsequent route table entry.

16. The article of manufacture of claim 8, wherein the instructions further cause the one or more processors to identify a subsequent route table entry using the previous route table entry wherein the entries are associated with a common peer routing protocol.

17. A method comprising:
   identifying a first entry in a route table, wherein the first entry is associated with a first routing protocol and has a link to a next entry also associated with the first routing protocol, and wherein the route table includes at least one entry associated with a second routing protocol;
   identifying the next entry using the link with the first entry; and
   identifying additional entries associated with the first routing protocol in the route table by using one or more links with identified entries until all entries associated with the first routing protocol have been identified in the route table, the identified route table entries forming a set; and
   transferring the set of route table entries from a first route table associated with a first executing process to a second route table associated with a second executing process.

18. The method of claim 17, further comprising purging the identified entries.

19. The method of claim 17, further comprising:
   detecting that the first routing protocol is inoperative;
   detecting that the first routing protocol becomes operational again within a predetermined period of time;
   determining whether the identified entries have been rediscovered within a predetermined period of time; and
   purging those identified entries that are not rediscovered within a predetermined period of time.

20. The method of claim 17, further comprising:
   detecting a request to transfer the identified entries; and
   transferring the identified entries.

21. The method of claim 17, wherein identifying the next entry in the route table using the first entry comprises using a pointer in the first entry to locate the next entry in the route table.

\* \* \* \* \*